G. M. HOLLENBACK.
OVEN OR FURNACE.
APPLICATION FILED FEB. 7, 1920.
1,341,903.
Patented June 1, 1920.
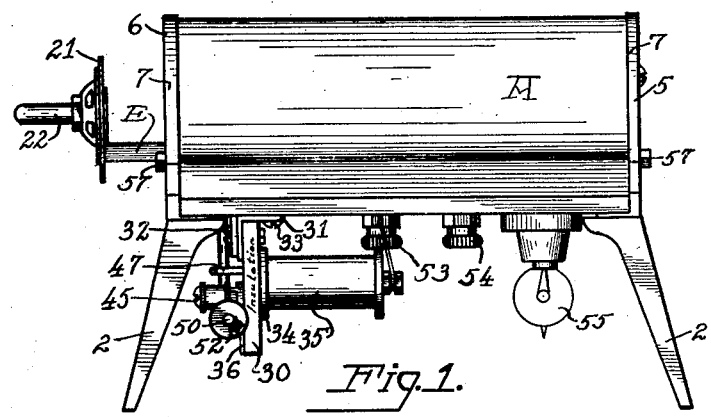
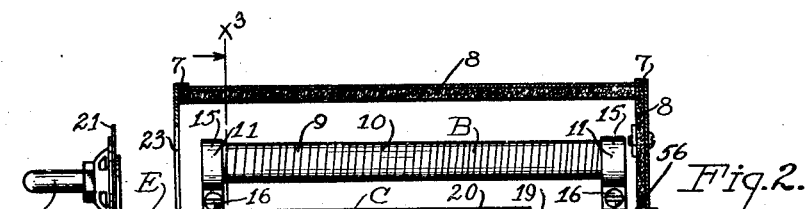
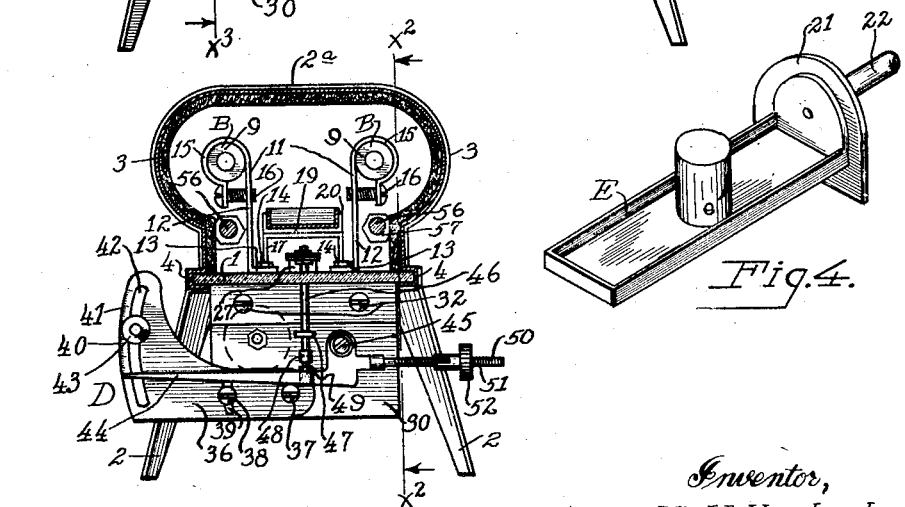
Inventor,
George M. Hollenback;
Attorney.

UNITED STATES PATENT OFFICE.

GEORGE M. HOLLENBACK, OF LOS ANGELES, CALIFORNIA.

OVEN OR FURNACE.

1,341,903.   Specification of Letters Patent.   Patented June 1, 1920.

Application filed February 7, 1920. Serial No. 356,862.

*To all whom it may concern:*

Be it known that I, GEORGE M. HOLLENBACK, a citizen of the United States, residing at Los Angeles, in the county of Los Angeles and State of California, have invented new and useful Improvements in Ovens or Furnaces, of which the following is a specification.

This invention relates to improvements in dental ovens such as required for treating investments of wax patterns and in dental casting, so as to volatilize the wax; and the primary object thereof is to provide a simply constructed, readily accessible, comparatively small, inexpensive, compact, durable and highly efficient dental oven utilizing electric heating elements, which is attractive and ornamental in appearance and capable of expeditiously producing higher grade work as compared to dental ovens of the present day type.

An object of the invention is to provide for preventing excessive heat in a dental oven of the above-mentioned character, in which electric heating elements are employed. To this end I provide a thermostat exposed to the heat of the oven, which thermostat automatically breaks the electrical circuit to the heating elements when a predetermined temperature is exceeded.

The invention further consists in the particular combination, inter-relation, construction, association and relative arrangement of the several parts, elements and features of the oven as illustrated in the drawing, described in this specification and finally pointed out in claims. Other objects and advantages will appear during the course of the following description.

In the drawing:

Figure 1 is a side elevation of an improved dental oven;

Fig. 2 is a longitudinal sectional view of the oven shown in Fig. 1, taken on the line $x^2$—$x^2$, Fig. 3 and looking in the direction of the appended arrows;

Fig. 3 is a vertical transverse sectional view of the oven taken on the line $x^3$—$x^3$, Fig. 2, and looking in the direction of the appended arrows; and, Fig. 4 is a perspective view of a tray used with the oven.

Corresponding parts in all the figures are designated by the same reference characters.

Referring particularly to the drawing, A designates an oven housing or body, B, electrical heating elements, C, a thermostat, D, a heat indicator, and E, a tray, all of which are used in practising the invention as one embodiment.

The oven housing or body A includes a bottom or base member 1 supported upon legs 2, one at each corner of the base member. The cover and side walls are formed integrally as shown in Fig. 3. The top part of the housing $2^a$, is practically flat, while its side members, as 3, are arcuate or in convex form for a portion; below that at each side is a portion in the form of an inwardly directed U, as at 4, used to clamp the housing to the bottom member or base 1. End members 5 and 6 of the housing have their edges flanged as at 7 in order to grip the end portions of the sides and top. The housing is lined throughout with a heat resistance substance, such as asbestos or clay, as shown at 8.

The electrical heating elements B include a cylindrical tube 9 formed of refractory material upon the periphery of which is wound resistance wire 10, such as iron or climax wire, and each turn of the wire is spaced from the immediately preceding turn, as shown in Fig. 2. Two electrical heating elements are provided within the dental oven, as shown in Fig. 3, and are arranged in parallel relation to one another. The heating elements are held in position by supports or brackets 11 having each a leg portion 12 and a foot 13 held to the bottom member 1 by means of a bolt and screw 14, and said leg portion 12 extends upwardly and is curved downwardly to form a clamping band 15 for the respective electrical heating element B. This clamping band may be regulated as to the amount of tension with which it grips the heating element B by means of a screw 16 threaded into the leg 12. As will be noticed by referring to Figs. 2 and 3, four of these supports are provided one for each end of each electrical heating element B.

Intermediately disposed between the supports 11 are pedestal brackets 17 in the form of an inverted channel iron. These pedestal brackets are held to the base portion 1 by means of bolts and screws 18. A member 19 is supported upon the pedestal brackets 17, the horizontal edges of which member 19 are bent upwardly, as shown at 20. This member 19 acts as a support and guide for the tray E.

The tray E is provided with a door 21 at one end, said door having a handle 22 projecting from same. This member E is used for holding small objects e which are to be heated. As will be observed upon referring to Fig. 2, the end member 6 has a portion cut out as at 23 to allow the member E to be inserted within the oven, and when the member E is completely within the oven, the cover 21 closes the hole or cut-out portion 23 of the end member 6, thus preventing any loss of heat from the interior of the oven.

The heat regulator or thermostat C includes a compound plate formed of aluminum and steel or brass and steel, or any two metals which bend by unequal expansion by an increment of heat. In this case the two metals must be so joined that the metal having the greatest lineal expansion is fastened at the bottom or beneath the other metal. As shown in Fig. 2 the metal plates 24 and 25 are held in fixed relation to one another by rivets 26. One end of the thermostat C is spaced and held at a fixed distance from the bottom member 1 by means of a washer 27 and a screw 28, while near the opposite end the metal plates 24 and 25 of the thermostat are bent into two oppositely convex portions to form a bearing, as shown at 29. Beneath and near one end of the base 1, is attached an angle iron bracket 31. This bracket is held by one leg to the base 1, by screws 33, while an insulation block 30 is supported by means of screws 32, to the other leg of the angle bracket. Projecting rearwardly from this insulation block as at 34, is a condenser 35, and on the opposite side of the insulation block is mounted the heat indicating means D. The means D includes a plate 36 held in position upon the block 30 by means of a screw 37 and an adjusting screw 38 mounted in a segmental slot 39 of the plate 36. Thus the indicator may be moved upwardly or downwardly in order to obtain proper adjustment of same. One edge of the plate 36 as at 40, is provided with graduated readings 41 for indicating a scale of heat degrees, and near the indicator readings 41 is an arcuated slot 42. Slidable within the slot 42 is a bolt and nut 43. This bolt and nut may be adjusted to any degree desired upon the scale 41. Likewise attached to the insulation block 30 is an indicating finger 44. As shown in Fig. 3 this indicating finger is held in an unslung position by means of a screw 45 embedded within the insulation block 30. The indicator finger 44 is of sufficient length so that the end of same plays over the graduations 41 and may contact with the bolt and nut 43. Pivotally suspended from the bearing 29 is a rod 46. This rod extends loosely downwardly through the base 1 and is held in position adjacent to the insulation block 30 by a keeper 47. The end of the rod 46 is provided with a contact point 48. A corresponding contact point 49 is mounted upon the indicating finger 44, as shown in Fig. 3, so that the contact points 48 and 49 may be held against each other. In order to make sure that the contact points may not become separated before desired, a member is provided directly opposite the finger 44 as shown at 50, in order to counterbalance the effect and weight of said finger. This member 50 is threaded as shown at 51, and upon this threaded portion is screwed a split lock nut 52. It is obvious that two different moments are set up around the supporting point 45, and the lock nut 52 is so adjusted upon the threads 51 that the weight to the right of the support 45 is greater than the weight to the left of said support.

The condenser 35 is shunted around the contact points 48 and 49 in order to prevent a sparking at this point.

In electrical ovens of the type concerned, it is important that they be so designed as to take advantage of all the conditions that will tend to secure the fullest and most rapid effect of a heating agent upon an object treated, without overheating. Most electrical ovens on the market today are provided with rheostats for regulating the amount of heat within the oven, but with this invention the thermostat takes the place of the rheostat. By referring to Fig. 3 and the description before given, concerning the shape or contour of the top and side walls of the housing A, it will be observed that the electrical heating elements B are disposed at practically the center of the arcuated curves or convex portions of the side walls 3. As before mentioned, it is at all times essential that every bit of heat be utilized and that none be lost, and the curved sides of the side walls 3 act as reflectors for the heat waves, concentrating same on the contents of the tray.

While the general wiring of the oven is not shown, it may be briefly described as follows: an electric circuit is connected by means of wires to the binding posts 53 and 54 mounted upon the bottom member 1. From the post 53 wiring connections are made to the thermostat C and thence through the arm 46, the contact points 48 and 49, through the indicator arm 44, then to the electrical heating elements B and through the wires 10 of same, and thence back to the binding post 54. A pilot light 55 shunts the binding posts 53 and 54 and burns when the oven is in operation.

One of the main features of this dental oven is the ease with which it may be assembled or disassembled. The end members 5 and 6 are held to the top and the side members and bottom member by their flanged portions 7 and further rigidly held in fixed relation to each other by stay bolts 56, which bolts are provided with nuts 57 at each end. Thus by removing the stay bolts the ends may be taken off the instrument and the interior of the oven rendered easily accessible in order to make any replacements necessary.

The operation is as follows:

The nut 43 is adjusted within the slot 42 to any desired point upon the scale 41, beyond which the indicating finger 44 cannot move. The predetermined maximum heat in the oven is fixed upon by adjusting the nut 43 along the scale 41 to the temperature reading which it is desired shall agree with such maximum heat. The electrical current is then switched on and the electrical resistance elements B become heated. As the interior of the oven increases in temperature the thermostat C, due to the fact that it is a combination of two metals which bend by the unequal expansion of same by an increment of heat, curves upwardly, and the more the thermostat curves the higher the rod 46 will be lifted. The contact point 49 will follow the contact point 48 until the indicating finger 44 is prevented from further movement by the bolt 43 at which time further movement or bending of the thermostat C will break the contact points 48 and 49, thus interrupting the circuit. When the interior of the oven has cooled sufficiently, the thermostat will tend to resume a normal condition, at which time the points 48 and 49 will contact with each other and again complete the electrical circuit and re-heat the oven.

The positive action of this thermostat completely does away with the necessity of providing the oven with a rheostat, as any degree of adjustment and temperature may be maintained within the oven by a simple adjustment of the nut 43.

It is obvious that many changes and variations and modifications may be made in departure from the particular description and showing of the accompanying drawing, in adapting the invention to varying conditions and requirements of use and service, without, however, departing from the true spirit of the invention.

What I claim and desire to secure by Letters Patent, is:

1. In a dental oven, the combination with a housing, including side and end walls, a cover and a bottom, said cover and side walls being integrally formed, inwardly projecting flanges on the periphery of said end walls, and the horizontal edges of the side walls, whereby the housing members may be readily disassembled or held together when assembled; a heating element disposed within the housing, and a thermostat exposed to the heat of the oven and controlling said heating element.

2. In a dental oven, the combination with a housing, including side and end wall members, a cover and a bottom, said cover and said side walls being integrally formed, inwardly projecting flanges on the periphery of said end members, and the horizontal edges of the side walls, stay bolts passing through and joining the end members, whereby the housing members may be rigidly held together, or readily disassembled; brackets mounted upon said bottom member, an electrical heating element removably held by said brackets, a heat regulator exposed to the heat of the oven, and means operative with the heat regulator and said heating element, whereby the electric circuit to the latter is broken when a predetermined heat within the housing is exceeded.

3. In a device of the character disclosed, a housing adapted to receive objects to be heated, an electrical resistance element disposed in the housing, and a support for the same comprising a bracket provided with a looped portion embracing the resistance element.

4. In a device of the character disclosed, a housing adapted to receive objects to be heated, an electrical resistance element disposed in the housing, and a support for the same comprising a bracket provided with a looped portion embracing the resistance element; means being provided for constricting the looped portion about the resistance element.

5. In a device of the character disclosed, a housing within which objects are adapted to be disposed for heating the same, said housing being provided with a curved wall portion and with a heating element disposed between said curved wall portion and the zone within which the objects to be heated are disposed, whereby heat waves are reflected to such objects from an extended surface of the housing.

6. In a device of the character disclosed, a housing within which objects are adapted to be disposed for heating the same, said housing being provided with a curved wall portion and with a heating element disposed between said curved wall portion and the zone within which the objects to be heated are disposed, whereby heat waves are reflected to such objects from an extended surface of the housing; said housing being provided with heat insulating lining 7. In a device of the character disclosed, a housing within which objects are adapted to be disposed for heating the same, said housing being provided with a curved wall portion and with a heating element disposed between said curved wall portion and the zone within which the objects to be heated are disposed, whereby heat waves are reflected to such objects from an extended surface of the housing; a bracket being provided within the housing for supporting the heating element, said bracket having a looped portion embracing the heating element.

8. In a device of the character disclosed, a housing within which objects are adapted to be disposed for heating the same, said housing being provided with a curved wall portion and with a heating element disposed between said curved wall portion and the zone within which the objects to be heated are disposed, whereby heat waves are reflected to such objects from an extended surface of the housing; a bracket being provided within the housing for supporting the heating element, said bracket having a looped portion embracing the heating element, and there being provided within the housing a tray support adapted to receive a tray at the zone of convergence of heat rays reflected by said curved portion of the housing wall.

9. A device of the character disclosed, comprising a housing having oppositely curved side walls and heating elements disposed adjacent to said curved walls respectively, whereby heat waves are reflected in converging projection toward the zone between the heating elements and within which zone objects to be heated are adapted to be disposed.

10. In a dental oven, the combination with a housing, including a base, side and end wall members, and a cover, legs supporting said housing, brackets mounted upon the top surface of said base, an electrical heating element removably held by said brackets, pedestal brackets mounted on said base adjacent said first named brackets, a member supported upon said last named brackets, the horizontal edges of which are upwardly bent, and a tray slidably accommodated between the upstanding edges of said member; a heat regulator disposed between said pedestal brackets, and means operative with the heat regulator and said heating element, whereby the electric circuit to the latter is broken when a predetermined heat is exceeded.

11. In a dental oven, the combination with a housing, having side and end walls, a cover and a bottom, and a lining of heat insulating material therein, an electric heating element disposed within said housing, a thermostat exposed to the heat of the oven, means connecting one end of said thermostat to the bottom of the housing, and in spaced relation thereto, a rod loosely passing downwardly through the base of said housing, one end of which rod is hingedly connected to the free end of the thermostat, an electric contact point removably mounted on the opposite end of said rod, and means operative with said contact point and said heating element whereby the electric circuit to said element is broken when a predetermined heat is exceeded.

12. In a dental oven, the combination with a housing, having side and end walls, a cover and a bottom, and a lining of heat insulating material therein, an electric heating element disposed within said housing, a thermostat exposed to the heat of the oven, means connecting one end of said thermostat to the bottom of the housing, and in spaced relation thereto, a rod loosely passing downwardly through the base of said housing, one end of which rod is hingedly connected to the free end of the thermostat, an electric contact point removably mounted on the opposite end of said rod, and means operative with said contact point and said heating element whereby the electric circuit to said element is broken when a predetermined heat is exceeded; said last named means comprising an indicator finger, an electrical contact point mounted on said finger, and which normally engages the contact point on the rod.

13. In a dental oven, the combination with a housing, including a base, side and end wall members and a cover, legs supporting said housing, brackets mounted upon the top surface of said base, an electrical heating element removably held by said brackets, pedestal brackets mounted on said base adjacent said first named brackets, a member supported upon said last named brackets, the horizontal edges of which are upwardly bent, and a tray slidably accommodated between the upstanding edges of said member, a thermostat disposed between said pedestal brackets, means connecting one end of said thermostat to the base of said housing and in a spaced relation thereto, a rod passing downwardly through the base of said housing, one end of which rod is hingedly connected to the free end of the thermostat, and an electric contact point removably mounted on the opposite end of the rod, an indicator finger, an electrical contact point mounted on said finger, and which normally touches the contact point on the rod, and means coacting with the indicator finger, whereby the contact points are moved apart, breaking the electrical circuit to the heating element, when a predetermined heat is exceeded.

14. In a dental oven, the combination with a housing, including a base, side and end wall members and a cover, legs supporting said housing, brackets mounted upon the top surface of said base, an electrical heating element removably held by said brackets, pedestal brackets mounted on said base adjacent said first named brackets, a member supported upon said last named brackets, the horizontal edges of which are upwardly bent, and a tray slidably accommodated between the upstanding edges of said member, a thermostat disposed between said pedestal brackets, means connecting one end of said thermostat to the base of said housing and in a spaced relation thereto, an insulation block mounted on the base beneath the housing, a rod loosely passing downwardly through the base of said housing and adjacent one side of the insulation block, one end of which rod is hingedly connected to the free end of the thermostat, an electrical contact point removably mounted on the opposite end of said rod, an indicator scale plate adjustably attached to the block, an indicator finger passing over the graduations of said scale, an electrical contact point mounted on said finger and which normally touches the contact point on the rod, and means coacting with the indicator finger whereby the contact points are moved apart, breaking the electrical circuit to the heating element when a predetermined heat is exceeded.

15. In a dental oven, the combination with a housing, including a base, side and end wall members and a cover, legs supporting said housing, brackets mounted upon the top surface of said base, an electrical heating element removably held by said brackets, pedestal brackets mounted on said base adjacent said first named brackets, a member supported upon said last named brackets, the horizontal edges of which are upwardly bent, and a tray slidably accommodated between the upstanding edges of said member, a thermostat disposed between said pedestal brackets, means connecting one end of said thermostat to the base of said housing and in a spaced relation thereto, an insulation block mounted on the base beneath the housing, a rod loosely passing downwardly through the base of said housing and adjacent one side of the insulation block, one end of which rod is hingedly connected to the free end of the thermostat, an electrical contact point removably mounted on the opposite end of said rod, an indicator scale plate adjustably attached to the block, an indicator finger passing over the graduations of said scale, an electrical contact point mounted on said finger and which normally touches the contact point on the rod, a condenser mounted on the opposite side of said insulation block and shunting the contact points, thus preventing sparking between same, and means co-acting with the indicator finger whereby the contact points are moved apart, breaking the electrical circuit to the heating element when a predetermined heat is exceeded; said means comprising a bolt and nut slidable within a segmental slot adjacent the indicator readings, which bolt and nut may engage one end of the indicator point at any desired reading on the scale; there being further means for counter-balancing the indicator finger.

In testimony whereof, I have signed my name to this specification in the presence of two subscribing witnesses.

GEORGE M. HOLLENBACK.

Witnesses:
RAYMOND I. BLAKESLEE,
MILDRED LEACH.